(No Model.)

T. N. VAIL.
Circuit Closer.

No. 240,205. Patented April 12, 1881.

WITNESSES
Arthur Reynolds
V. D. Dearborn

INVENTOR
Theodore N. Vail.
by Crosby & Gregory Attys.

UNITED STATES PATENT OFFICE.

THEODORE N. VAIL, OF BOSTON, MASSACHUSETTS.

CIRCUIT-CLOSER.

SPECIFICATION forming part of Letters Patent No. 240,205, dated April 12, 1881.

Application filed July 15, 1880. (No model.)

*To all whom it may concern:*

Be it known that I, THEODORE N. VAIL, of Boston, county of Suffolk, State of Massachusetts, have invented an Improvement in Circuit-Closers, of which the following description, in connection with the accompanying drawings, is a specification.

My invention relates to electric circuit closers or switches, and is shown embodied in an automatic switch for telephonic circuits, such as invented by Geo. L. Anders, of Boston, Massachusetts. In Anders' invention an annunciator-drop or indicating-instrument is arranged so that when in its normal position, awaiting a signal, it closes an electric circuit through its own operating-magnet, and when operated by the said magnet it falls, by its own weight, into contact with a stop or anvil common to several of the said drops, from which an electric circuit passes through the secondary coil of a transmitter, or the induction-coil of a magneto-telephone, or both. The said circuit, through the operating-magnet of the indicating-instrument, is a continuation of one of the usual subscriber's circuits for which the said indicating-instrument announces that a communication is desired, and the circuit through the telephonic instrument is immediately automatically connected, by the fall of the indicator or drop, with that one of the subscriber's circuits from which the signal was received. In that instrument, as well as in others in which a circuit is closed by the contact of pieces of metal, one of which rests on the other by its own weight, it has been found that the said contact is not very perfect, it affording considerable resistance, and often failing to close the circuit at all.

I have discovered means to overcome this difficulty, my invention consisting in magnetizing the anvil upon which the co-operating circuit-closing device, (shown as the drop or indicating device,) which should be magnetic as well as conductive material, rests or falls, either by a permanent or an electro magnet. By this arrangement the magnetic attraction between the anvil and the drop or co-operating circuit-closing device used in connection therewith is sufficient to insure a perfect electrical contact between the said parts, and a serious objection to the practical operation of the above-mentioned indicating and automatic circuit-closing device is obviated.

Figure 1:
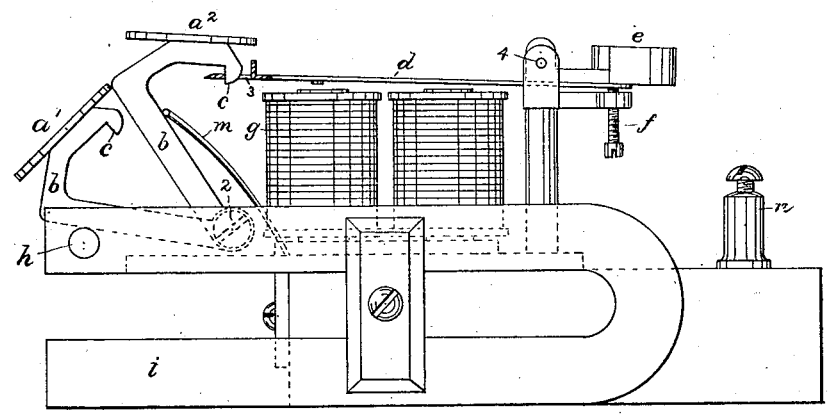
Figure 2:
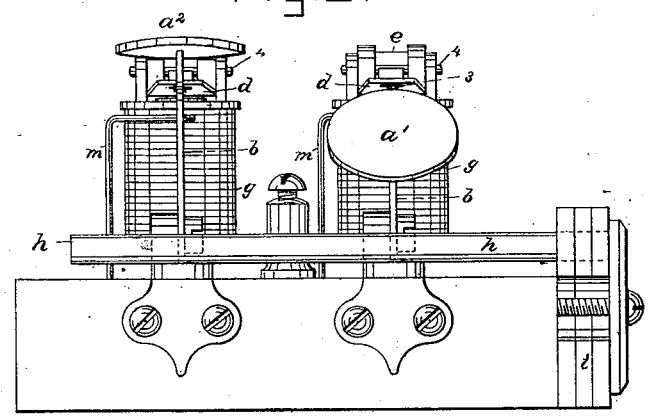

Figure 1 is a side, and Fig. 2 a front elevation, of an indicating and automatic circuit-closing apparatus provided with my improvements.

The annunciator-drops $a'$ $a^2$, supported on arms $b$, of magnetic material, pivoted at 2, and provided with hooks $c$, to be engaged and held by eyes or slots 3 in the armatures $d$, pivoted at 4, and each provided with a counterbalancing-weight, $e$, and adjusting-screw $f$, and operated by an electro-magnet, $g$, may be of any usual construction. The magnets $g$, the coils of each of which are included in one of the usual subscriber's circuits, are normally demagnetized, the armatures being held up by their weights $e$ in position to engage the hooks $c$ of the drop-arms $b$ normally in the position of the one supporting the drop $a^2$. The drop-arms $b$ are so poised over their pivots 2 that when the hook $c$ is released the arm $b$ falls, by its own weight, until its movement is arrested by the stop $h$, herein shown as a rod of soft iron connected with one of the poles of and magnetized by the permanent magnet $i$. (Shown as a large compound horseshoe-magnet.) By this arrangement, in addition to the pressure caused by its weight, the drop-arms $b$ are drawn by the magnetic force into close contact with the rod or anvil $h$, to form a certain passage for the electric current.

It is obvious that a magnetized anvil of this sort may be used to close an electric circuit for any purpose where it is not practicable to obtain a good rubbing-contact of sufficient pressure between two circuit-closing devices, and that the said anvil may be magnetized by an electro-magnet, instead of a permanent magnet, as herein shown, when it is more convenient to do so.

In the apparatus shown, the drop-arms $b$, when in their normal position, held up by the armatures $d$, are in contact with flexible circuit closers $m$, and the circuits are as follows: each line-wire constituting a subscriber's circuit is connected with one of the binding-screws, $n$, itself connected with the frame-work and arm $b$ of its corresponding indicating device, the circuit continuing from the said arm $b$, when in its normal condition, through the circuit-closer $m$ and coils of the magnet $g$, to the ground.

The magnetized anvil $h$ of the arms $b$ is insulated therefrom and connected with one electrode of suitable telephonic instruments, as a hand-telephone, and a secondary coil of a transmitter, the other electrode whereof is connected with the ground. When a subscriber desires to call the central office he passes an electric current through his circuit in any usual manner, the said current passing through the arm $b$, circuit-closer $m$, and coils of the magnet $g$, in connection therewith, thus magnetizing the said magnet, whereby the armature $d$ is attracted and the drop-arm $b$ released to allow it to fall into contact with the magnetized anvil $h$, thus breaking the circuit between $b$ and $m$, and closing it between $b$ and $h$, and thereby throwing the magnet $g$ out of circuit, and telephonic instrument connected with the anvil $h$ in circuit, all substantially as in Anders' invention, hereinbefore referred to, the drop being then displayed in the position shown at $a'$. After the communication has come to an end the drop-arm $b$ is raised by hand, whereupon it is engaged by the armature $d$, closing the circuit at $b\ m$ and breaking it at $b\ h$, thus restoring the subscriber's circuit to its normal condition, ready to signal the central office.

The anvil $h$ is herein shown as extending under, and adapted to co-operate with, two drop-arms, $b$, so that either one of the corresponding subscribers' circuits will be immediately thrown automatically into connection with the central telephonic instruments, and it is obvious that a large number of drops may be so arranged with a single anvil, $h$, and that as many of the said anvils as are desired may be connected together in circuit with the said telephonic instruments, they either being separate rods connected by wires, and each provided with a magnetizing-magnet, or being a continuous rod provided with as many magnets $i$ as may be found necessary to properly magnetize the anvil-pieces $h$.

I claim—

1. The combination, with the drop of an annunciator or other instrument, which drop is of magnetic and conducting material, of a co-operating magnetized anvil, and means for connecting conductors with said drop and anvil, substantially as described, so that when said drop is allowed to fall it acts as a circuit-closer, and the magnetic attraction between itself and the anvil insures a perfect electrical contact, as explained.

2. A series of indicating devices or annunciator-drops of magnetic material, each forming a portion of an electric circuit, and a magnetized anvil common to the said drops, whereby when any one of the said drops falls it is brought into perfect electric contact with the said anvil to complete the circuit from the said drop to the said anvil, substantially as described.

3. The combination, with a series of indicating-instruments or annunciator-drops, a portion whereof is of magnetic and conductive material, of an iron rod, arranged to receive the said drops when allowed to fall, and a magnet connected with the said rod to magnetize it, as and for the purpose described.

In testimony whereof I have signed my name to this specification in the presence of two subscribing witnesses.

THEODORE N. VAIL.

Witnesses:
JOS. P. LIVERMORE,
ARTHUR REYNOLDS.